United States Patent

Kobayashi et al.

[11] Patent Number: 5,902,244
[45] Date of Patent: May 11, 1999

[54] ULTRASONIC DIAGNOSIS APPARATUS INCLUDING SIMPLE DIGITAL SCAN CONVERTER

[75] Inventors: Hideyuki Kobayashi, Hino; Atsushi Osawa, Kokubunji; Yoshihiro Kodaira, Hachioji; Masahiko Gondo, Yamanashi, all of Japan

[73] Assignee: Olympus Optical Co., Ltd., Japan

[21] Appl. No.: 08/995,647

[22] Filed: Dec. 22, 1997

[30] Foreign Application Priority Data

Feb. 5, 1997 [JP] Japan ................................. 9-022958
Apr. 21, 1997 [JP] Japan ................................. 9-103520

[51] Int. Cl.[6] ........................................................ A61B 8/00
[52] U.S. Cl. ........................................... 600/447; 600/445
[58] Field of Search ................................... 600/444, 445, 600/447, 448, 437, 462; 368/113; 73/597, 626

[56] References Cited

U.S. PATENT DOCUMENTS

| | | |
|---|---|---|
| 5,349,960 | 9/1994 | Gondo . |
| 5,611,343 | 3/1997 | Wilson ..................................... 600/445 |
| 5,640,961 | 6/1997 | Verdonk ................................... 600/462 |
| 5,706,818 | 1/1998 | Gondo ..................................... 600/447 |

FOREIGN PATENT DOCUMENTS

| | | | |
|---|---|---|---|
| 64-64635 | 3/1989 | Japan . | |
| 4-171500 | 6/1992 | Japan ................................ | G10L 9/18 |
| 4-344699 | 12/1992 | Japan ................................ | G10L 9/14 |
| 4-363000 | 12/1992 | Japan ................................ | G10L 9/18 |
| 5-6199 | 1/1993 | Japan ................................ | G10L 9/14 |
| 89/04143 | 5/1989 | WIPO . | |

*Primary Examiner*—Francis J. Jaworski
*Assistant Examiner*—Ali M. Imam
*Attorney, Agent, or Firm*—Ostrolenk, Faber, Gerb & Soffen, LLP

[57] ABSTRACT

An ultrasonic diagnosis apparatus comprises a probe having a plurality of transducers for performing transmission/reception of ultrasonic waves; a selection circuit for sequentially selecting the transducers for performing transmission/reception of ultrasonic waves; and an A/D converter for converting a reception waveform signal from the transducer selected by the selection circuit into a digital waveform signal. The apparatus also includes a memory for storing the digital waveform signal converted by the A/D converter in correspondence with the selected transducer; and a read control circuit having a wavefront locus address generator for generating a wavefront locus data corresponding to time-of-flight data between each point in an ultrasonic scanning region and respective transducers to synthesize a wavefront converging on a point in the ultrasonic scanning region (including points which are not located on lines normal to the radiating surfaces of the transducers). The apparatus also includes an output unit for outputting the wavefront locus data to the memory as a read address in order to read waveform samples along the wavefront; and a synthesis circuit for synthesizing the waveform samples read from the memory by a read address from the read control circuit.

13 Claims, 13 Drawing Sheets

ULTRASONIC DIAGNOSIS APPARATUS INCLUDING SIMPLE DIGITAL SCAN CONVERTER

BACKGROUND OF THE INVENTION

1. Field of the Invention

The present invention relates to an ultrasonic diagnosis apparatus capable of displaying a living body tomographic image generated on the basis of an ultrasonic echo signal which is received by transmitting an ultrasonic wave into a living body.

2. Description of the Related Art

A conventional ultrasonic diagnosis apparatus is commonly used which radiates an ultrasonic pulse to a portion in a living body to be diagnosed. The apparatus receives a reflected wave from the tissue of the living body and processes the reception signal of the ultrasonic echo signal to obtain a living body tomographic image. This apparatus can obtain a tomographic image without exposing a patient to X-rays when an X-ray photograph is taken, unlike an X-ray diagnosis apparatus. For this reason, the ultrasonic diagnosis apparatus is used for diagnosis in situations such as obstetrics-gynecology and the like.

In an ultrasonic diagnosis apparatus of this type, it has been known to obtain a tomographic image in a living body using a method called a synthetic aperture method. For example, this apparatus is disclosed in U.S. Pat. No. 5,349,960, International Patent Disclosure Number WO89/04143.

In the synthetic aperture method, ultrasonic transducers arranged in an array are changed over, and the transmission and reception of the ultrasonic wave are repeated by the selected ultrasonic transducer.

The ultrasonic waves are received by the respective ultrasonic transducers and converted into electric waveform signals. The electric waveform signals are digitized and stored in the form of time-sequential signals in a waveform memory, wherein each of the time-sequential signals represents the ultrasonic waveform in the sound-ray direction which is normal to the radiating surface of corresponding transducer.

Amplitude data is sampled and summed across the stored waveforms along a wavefront locus converting onto a desired focal point, to be synthesized into a reflection amplitude from the focal point. In this synthesis processing, the wavefront locus consists of time-of-flight data between the focal point and respective transducers.

In such an ultrasonic diagnosis apparatus using the synthetic aperture method, reception focusing can be freely performed throughout an imaging region. For this reason, an ultrasonic tomographic image having a high spatial resolution can be obtained.

The conventional ultrasonic diagnosis apparatus using a synthetic aperture method is designed to be adapted to various shapes and arrangements of array transducers such as linear shapes, concave shapes or convex shapes. Since each of these array transducers has its own direction and density of sound-ray distribution, the ultrasonic diagnosis apparatus performs a coordinate transforming process and an interpolation process at a digital scan converter (DSC). However, in order to perform such a coordinate transforming process and interpolation process in real time, a large and complex hardware arrangement is disadvantageously required. In addition, since interpolation is performed in accordance with a ratio of spatial distances from neighbor pixels in a conventional interpolation process, the image is still vague especially in a portion of coarse sound-ray distribution.

For an endoscopic application, the ultrasonic diagnosis apparatus is often required to be adapted to an ultrasonic probe for mechanical radial-scanning use. It is also necessary to perform a coordinate transforming process and an interpolation process. As a result, the cost increases, and the apparatus increases in size because a complex processing circuit is required.

OBJECTS AND SUMMARY OF THE INVENTION

It is an object of the present invention to provide an ultrasonic diagnosis apparatus, using a synthetic aperture method, in which the arrangement of a DSC can be simplified, and an ultrasonic tomographic image can be obtained by this simple DSC.

It is another object of the present invention to provide an ultrasonic diagnosis apparatus which: (i) has a simple arrangement having no coordinate transforming circuit or interpolation circuit added, (ii) can cope with electronic scanning and mechanical radial scanning, and (iii) can be reduced in cost and size.

The first arrangement of the present invention comprises:

a probe having a plurality of transducers for performing transmission/reception of ultrasonic waves;

selection means for sequentially selecting the transducers for performing transmission/reception of ultrasonic waves;

A/D conversion means for converting a reception waveform signal from the transducer selected by the selection means into a digital signal;

a waveform memory for storing the digital signal converted by the A/D conversion means in correspondence with the selected transducer;

read control means having a wavefront locus generator for generating a wavefront locus corresponding to time-of-flight data between each point in an ultrasonic scanning region and respective transducers to synthesize wavefronts converging on points in the ultrasonic scanning region including points which are not located on the normals of the radiating surfaces of the transducers and an output unit for outputting the wavefront locus to the waveform memory as a read address; and synthesis means for synthesizing waveform samples read from the waveform memory by a read address from the read control means.

The second arrangement of the present invention comprises:

a transducer group obtained by arranging transducers for transmitting/receiving ultrasonic waves in an array;

electronic scanning means for selecting a specific transducer from the transducer group in transmission/reception to perform an electronic scanning operation;

mechanical scanning means for performing a mechanical radial scanning operation for the transducers for transmitting/receiving ultrasonic waves;

switching means for performing a switching operation between a reception waveform signal in the electronic scanning operation and a reception waveform signal in the mechanical radial scanning operation;

A/D conversion means for converting the reception waveform signal obtained by the electronic scanning operation or the mechanical scanning operation into digital waveform signal;

a waveform memory for storing the digital waveform signal converted by the A/D conversion means in a time-sequential manner;

a phase correction factor memory for storing phase correction factors corresponding to time-of-flight data between each point in a scanning region and respective transducers;

an interpolation factor memory for storing interpolation factors corresponding to the distances between each pixel of a display image and its neighbor samples of the waveforms;

factor selecting means for selecting a phase correction factor from the phase correction factor memory in the electronic scanning operation, and selecting an interpolation factor from the interpolation factor memory in the mechanical radial-scanning operation;

multiplication process means for multiplying waveform samples read from the waveform memory and output of the factor selecting means;

synthetic operation means for synthetically operating a plurality of data processed by the multiplication process means.

Other features and advantages of the present invention will be apparent from the following description.

DETAILED DESCRIPTION OF THE INVENTION

Conventional Arrangement of an Ultrasonic Diagnosis Apparatus Using a Synthetic Aperture Method An ultrasonic diagnosis apparatus using a synthetic aperture method and a method of generating an ultrasonic tomographic image of the prior art will be described below.

Figure 1:
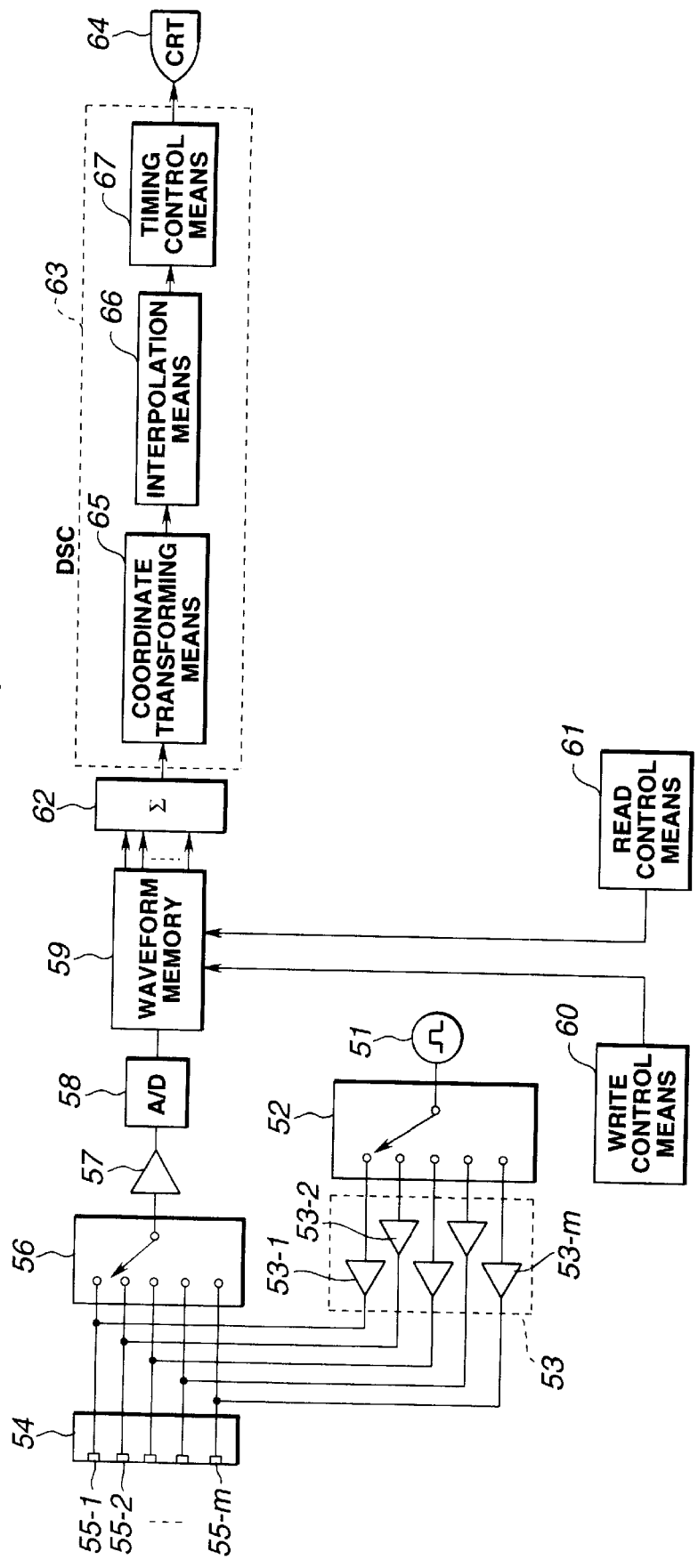
FIG. 1 is a block diagram showing one example of an arrangement of an ultrasonic diagnosis apparatus using a synthetic aperture method in accordance with the prior art.

An arrangement of the ultrasonic diagnosis apparatus is shown in FIG. 1. The ultrasonic diagnosis apparatus comprises a transmission signal generation means 51 for generating transmission signals of ultrasonic pulses; a transmission signal amplifier means 53 having a plurality of amplifier circuits 53-1 to 53-m for amplifying the transmission signals; and a probe 54 in which a plurality of ultrasonic transducers (to be referred to simply as transducers hereinafter) 55-1 to 55-m for transmitting/receiving ultrasonic waves are arranged in the form of an array. The apparatus also includes a multiplexer 52 for selectively, sequentially supplying the transmission signals to the amplifier circuits 53-1 to 53-m to drive the transducers 55-1 to 55-m; and a multiplexer 56 for sequentially selecting an output from one transducer which is an ultrasonic waveform signal reflected from the tissue of a living body. The apparatus also includes a reception signal amplifier means 57 for amplifying the ultrasonic waveform signal selected by the multiplexer 56; an A/D converter means 58 for converting an analog waveform signal output from the reception signal amplifier means 57 into a digital waveform signal; and a waveform memory 59 for storing a digital signal output from the A/D converter means 58. The apparatus also includes a write control means 60 for controlling an operation for writing data to the waveform memory 59 in a time-sequential manner; a read control means 61 for controlling an operation for reading waveform samples from the waveform memory 59; and a summing circuit (Σ) 62 for summing the waveform samples read from the waveform memory 59. The apparatus also includes a digital scan converter (DSC) 63 for processing a digital signal from the summing circuit 62 to output the signal in accordance with respective output devices; and a display means 64 constituted by a CRT or the like for displaying an image signal output from the DSC 63.

The DSC 63 comprises: a coordinate transforming means 65 for performing coordinate transforming for an input signal, e.g., transforming from a polar coordinate system to an orthogonal coordinate system; an interpolation means 66 for performing interpolation for a pixel of an image signal subjected to coordinate transforming; and a timing control means 67 for controlling the timing in accordance with output devices.

The operation of the above ultrasonic diagnosis apparatus will now be described. A transmission signal is generated by the transmission signal generation means 51, and a transmission signal of a signal line corresponding to a specific transducer is selected by the multiplexer 52. Thereafter, the selected transmission signal is amplified by the transmission signal amplifier means 53 to be supplied to the probe 54. Here, when the transducer 55-1 is selected, the multiplexer 52 functions to select the amplifier circuit 53-1 in the transmission signal amplifier means 53, and the transducer 55-1 on the signal line is selected to be driven. Referring to FIG. 1, the amplifier circuits 53-1 to 53-m of the transmission signal amplifier means 53 correspond to the transducers 55-1 to 55-m, respectively.

The transducer 55-1 to which the transmission signal is supplied as mentioned above radiates pulse-like ultrasonic waves to a portion to be diagnosed in a living body (not shown). Thereafter, the ultrasonic waves reflected by tissue of the living body are received by the same transducer 55-1. The signal line of the transducer 55-1 is then selected by the multiplexer 56 and a waveform signal is amplified by the reception signal amplifier means 57. The analog waveform signal obtained through the series of process systems is converted into a digital waveform signal by the A/D converter means 58, to be stored in the waveform memory 59. A write operation into the waveform memory 59 at this time is controlled by the write control means 60.

Figure 2:
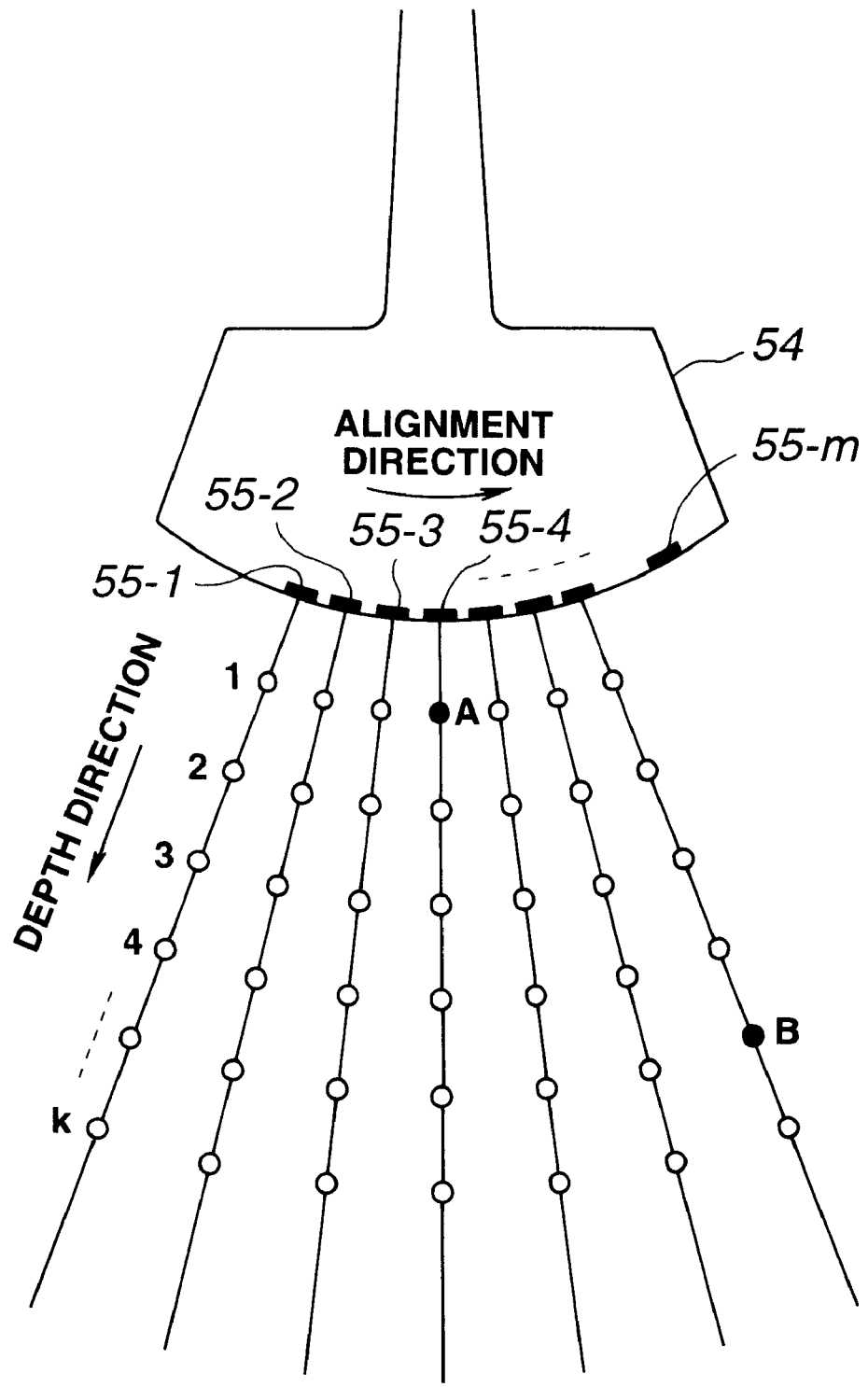
FIG. 2 is a functional view for explaining an ultrasonic scanning operation in accordance with the prior art.

In the above description, the data acquisition sequence with respect to one transducer is described. This sequence corresponds to an amount of information of one line in the depth direction of an observation region within the living body. Therefore, when the same ultrasonic scanning process is performed to the transducers 55-2 to 55-m, waveform data for a whole image can be obtained. More specifically, the data of a reflected signal related to a portion indicated by a white circle (mark O) in the observation region shown in FIG. 2 can be obtained. FIG. 2 shows a case wherein the probe 54 is of a convex type. In FIG. 2, reference symbol m denotes the number of scanning directions, i.e., the number of arranged transducers; and k denotes the number of sample points in the depth direction in the observation region. The data are called wavefront data and are obtained by sequentially scanning ultrasonic waves with respect to the transducers 55-1 to 55-m, and the data of the respective reflected signals are stored in the wavefront memory 59.

Figure 3:
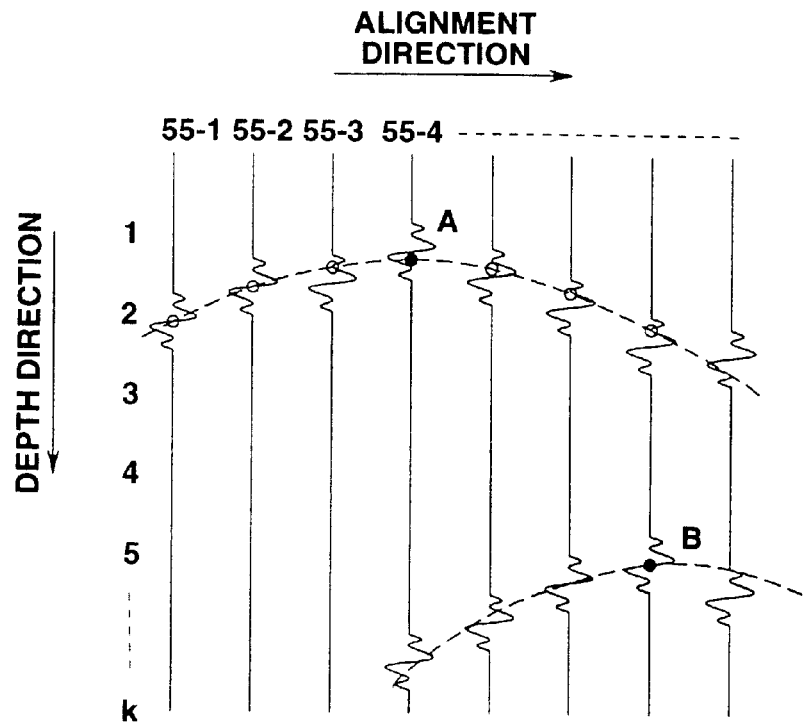
FIG. 3 is a functional view showing the image of waveform signal stored in a waveform memory in accordance with the prior art.

In FIG. 3, the images of the waveform data stored in the waveform memory 59 are indicated by solid lines. The reference numerals and symbols shown in FIG. 3 correspond to those in FIG. 2, and arrows indicate the scanning orders. The write control means 60 addresses the waveform memory 59, and the waveform memory 59 is stored with time-sequential signals representing waveforms, each of which is a reflection amplitude distribution on a corresponding sound-ray. The reflected signal from point A or B in FIG. 2 is also received by transducers near the transducer 55-4, for example, with respect to point A as shown in FIG. 3 because ultrasonic beams of the transducers the transducers 55-1 to 55-m.

A method of constructing an ultrasonic tomographic image will now be described. In the waveform memory 59, an address or the like is controlled by the read control means 61 to read waveform samples along a wavefront locus converging onto a focal point. Referring to FIG. 3, broken lines indicate scanning images corresponding to points A and B, respectively. The procedure of performing read control when pixels located at points A and B are reproduced will now be described. In this case, waveform samples forming an amplitude distribution on a wavefront locus converging onto a focal point corresponding to a pixel to be reproduced are read from the waveform memory 59 to reproduce a pixel of interest, and are subjected to a synthesis process.

Here, an example is shown wherein the pixel of interest at point A is subjected to a synthesis process by using waveform samples along a certain wavefront locus of seven points. In order to read waveform samples along the wavefront locus from the waveform memory 59, address control and generation of control signal are performed by the read control means 61. In this example, the number of addresses generated by the read control means 61 corresponds to an amount of data which is seven times the number of pixels. With the above procedure, the waveform samples along the wavefront locus from the waveform memory 59 is converted into the intensity of a pixel to be reproduced in such a manner that the process of summing is performed by the summing circuit 62.

As has been described above, the method of performing the process to sum data along the wavefront locus to obtain intensity of the pixel is based on the synthetic aperture method. After a time difference determined by a spatial position relationship between a focal position and each transducer is adjusted to perform phase matching, the reflection intensity value of the focal position can be obtained when the data are summed by summing circuit 62.

Figure 4:
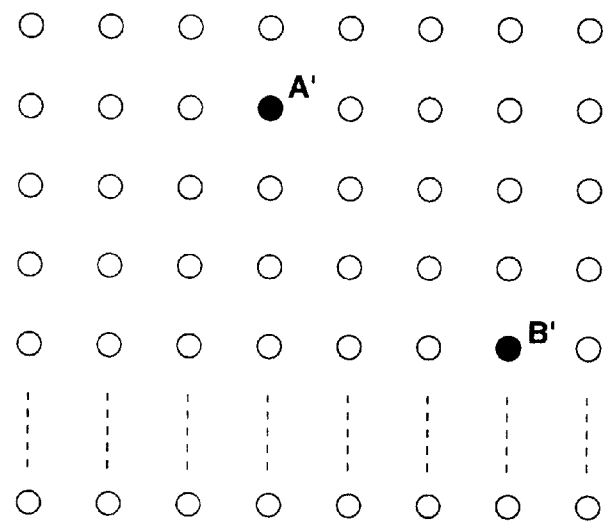
FIG. 4 is a functional view showing the image of intensity data after a synthetic aperture process in accordance with the prior art.

FIG. 4 shows outputs from the summing circuit 62 with respect to points A and B, i.e., results of the aperture synthesis. Operation results at points A and B are indicated by points A' and B', respectively. More specifically, the positional relationship between waveform samples in the wavefront memory 59 before the operation, shown in FIG. 3, and the positional relationship between intensity of pixels in the summing circuit 62 after the operation, shown in FIG. 4, have a one-to-one correspondence.

For example, the DSC 63 causes the intensity data obtained as a result of the operation as mentioned above to correspond to a space in a body to be observed. Thus, the intensity data is subjected to a coordinate transformation and interpolation process so as to become easier to be seen as an observed image. The details of the DSC 63 will be described below.

Figure 5:
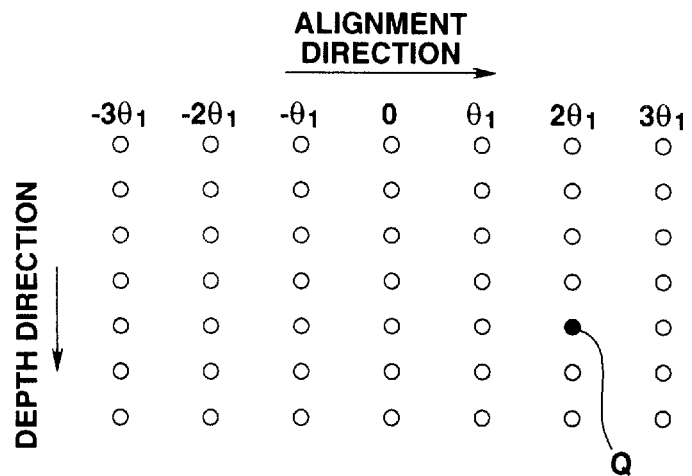
FIG. 5 is a functional view showing the arrangement of intensity data before a coordinate transforming process in accordance with the prior art.
Figure 6:
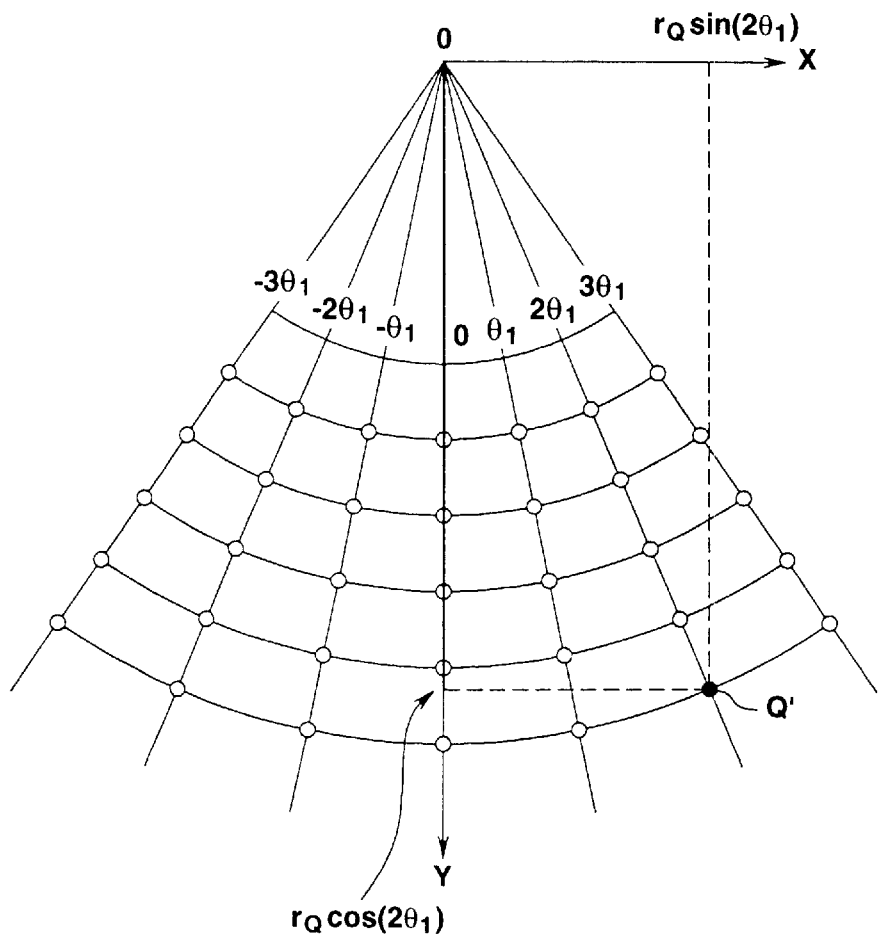
FIG. 6 is a functional view showing the data positions of pixels corresponding to an image displayed after a coordinate transforming process in accordance with the prior art.

In the DSC 63, a synthetic output of intensity data obtained by the summing circuit 62 on the previous stage is subjected to coordinate transformation by the coordinate transforming means 65. FIGS. 5 and 6 are views for explaining this process. FIG. 5 is a view showing data strings which have not been subjected to coordinate transformation and have been subjected to a synthetic operation. FIG. 5 corresponds to FIG. 4. Here, the vertical direction indicates the depth direction of an observation region, and the horizontal direction indicates a radiation position direction of an ultrasonic wave related to the arrangement of transducers. FIG. 6 is a view showing the display position of an actual monitor after coordinate transformation, i.e., a position corresponding to the pixel position of an actual tomographic image.

In a convex-type probe 54, a surface on which the transducers 55-1 to 55-5 are arranged has an arc-like shape. When this arc is considered as a part of a circle, it is assumed that an imaginary central point of the circle is represented by O, and an angle between the imaginary central point O and an adjacent transducer is represented by $\theta_1$. The pixel data obtained after the synthetic operation in FIG. 5 have, in fact, the positional relationship as shown in FIG. 6. A coordinate transformation method used when a waveform sample at point Q (pixel at the position on the fifth row and the sixth column) in FIG. 5 is converted into actual pixel position Q' will now be described. Assume that the distance from the imaginary central point O to Q is represented by $r_Q$; that a vertical line on the fourth column is represented by a y axis; and that a horizontal line is represented by an x axis. In this case, the coordinate position (x,y) of point Q' is represented by the following expressions:

$x$ coordinate: $r_Q \sin(2\theta_1)$       (1)

$y$ coordinate: $r_Q \sin(2\theta_1)$       (2)

When all data except for point Q are subjected to an arithmetic process by using expressions (1) and (2), the data are transformed to the coordinate system shown in FIG. 6.

Figure 7:
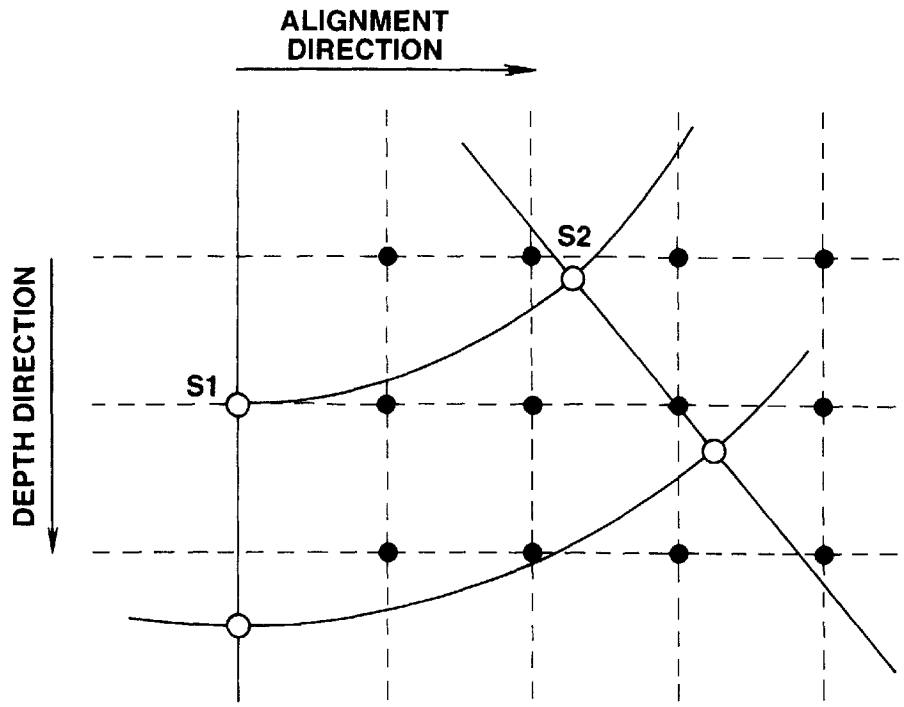
FIG. 7 is an enlarged functional view showing a part of FIG. 6.

After the coordinate transforming process is performed, an interpolation process is performed by the interpolation means 66. With the convex-type probe, if an ultrasonic wave is radiated from each transducer onto a portion to be diagnosed in a living body, the sound-ray density of ultrasonic waves in a far point is lower than that in a near point. Since the sound-ray interval of ultrasonic waves is larger that the interval between pixels to be displayed on a monitor, data must be interposed between the sound rays to form a preferable image. FIG. 7 is a view obtained by enlarging a part of FIG. 6. In the interpolation means 66, on the basis of pixel data at points indicated by white circles processed by the coordinate transformation means 65 on the previous stage, an interpolation process for generating data corresponding to a portion indicated by a black circle (mark ●) between the white circles is performed.

Figure 8:
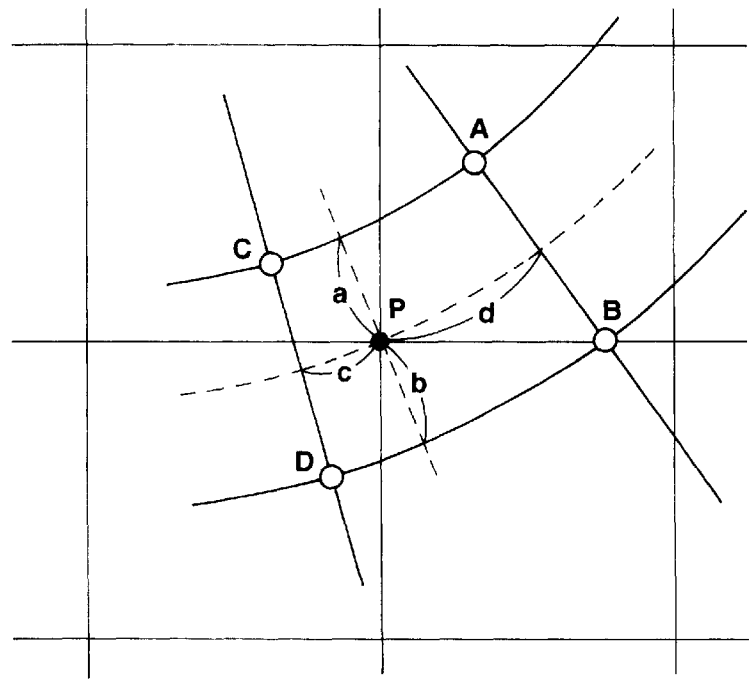
FIG. 8 is a functional view for explaining an interpolation process in the arrangement in FIG. 1.

A general interpolation process method performed in the ultrasonic diagnosis apparatus using the synthetic aperture method will be described below with reference to FIG. 8. Referring to FIG. 8, reference symbol P denotes data to be interpolated, and A, B, C, and D denote pixel data around the point P. Here, the distances from a line AC, a line BD, a line CD, and a line AB to point P are represented by a, b, c, and d, respectively. The arc-like lines in FIG. 8 indicate radiation directions of ultrasonic waves, and cross points of horizontal lines and vertical lines indicate pixel positions displayed by the display means 64. The interpolation data of point P indicated by the black circle can be calculated by the following equation:

$$P=(c/(c+d))\cdot((bA+aB)/(a+b)) +(d/(c+d)\cdot((bD+aC)/(a+b)) \quad (3)$$

Therefore, when data to be interpolated is derived by equation (3) from pixel data at four neighbor points, pixel data at the positions of points indicated by black circles as shown in FIG. 7 can be generated. The interpolated pixel data are subjected to timing control by the timing control means 67 on the next stage in accordance with various output devices such as a CRT, and are output at a predetermined data rate and defined timing.

The ultrasonic diagnosis apparatus using the synthetic aperture method generates an ultrasonic tomographic image by the series of arrangements and the various image processes as mentioned above.

When an ultrasonic tomographic image is to be generated by the arrangements and procedures as mentioned above, a large and complex hardware arrangement is disadvantageously required to perform a coordinate transformation process and an interpolation process in the DSC 63 in real time. In addition, in the interpolation process as mentioned above and shown in FIG. 8, interpolation is performed in accordance with a ratio of spatial distances from neighbor pixels in a conventional interpolation process and, therefore, the resultant image is still vague (or blurry) especially in a portion of coarse sound-ray distribution.

DETAILED DESCRIPTION OF THE PREFERRED EMBODIMENT

Embodiments of an ultrasonic diagnosis apparatus for solving such problems encountered in the prior art will be described below.

FIGS. 9 to 15 show the first embodiment of the present invention.

The ultrasonic diagnosis apparatus according to this embodiment comprises a transmission signal generator means 1 for generating transmission signals of ultrasonic pulses; a transmission signal amplifier means 3 having a plurality of amplifier circuits 3-1 to 3-m for amplifying the transmission signals; and a probe 4 in which a plurality of transducers 5-1 to 5-m for transmitting/receiving ultrasonic waves are arranged in the form of an array. The apparatus also includes a multiplexer 2 for selectively, sequentially supplying the transmission signals to the amplifier circuits 3-1 to 3-m to drive the transducers 5-1 to 5-m; a multiplexer 6 for sequentially selecting an output from one transducer which is an ultrasonic waveform signal received by one of the transducers 5-1 to 5-m from the tissue of a living body. The apparatus also includes a reception signal amplifier means 7 for amplifying the ultrasonic waveform signal selected by the multiplexer 6; an A/D converter means 8 for converting an analog waveform signal output from the reception signal amplifier means 7 into a digital signal; and a waveform memory 9 for storing a digital signal output from the A/D converter means 8. The apparatus also includes a write control means 10 for controlling an operation for writing data to the waveform memory 9 in a time-sequential manner; a read control means 11 for controlling an operation for reading waveform samples from the waveform memory 9; and a summing circuit (Σ) 12 for summing the waveform samples read from the waveform memory 9. The apparatus also includes a digital scan converter (DSC) 13 for processing a digital signal from the summing circuit 12 to output the signal in accordance with respective output devices; and a display means 14 constituted by a CRT or the like for displaying an image signal output from the DSC 13. The DSC 13 includes a timing control means 15 for controlling timing depending on the output device.

Figure 10:
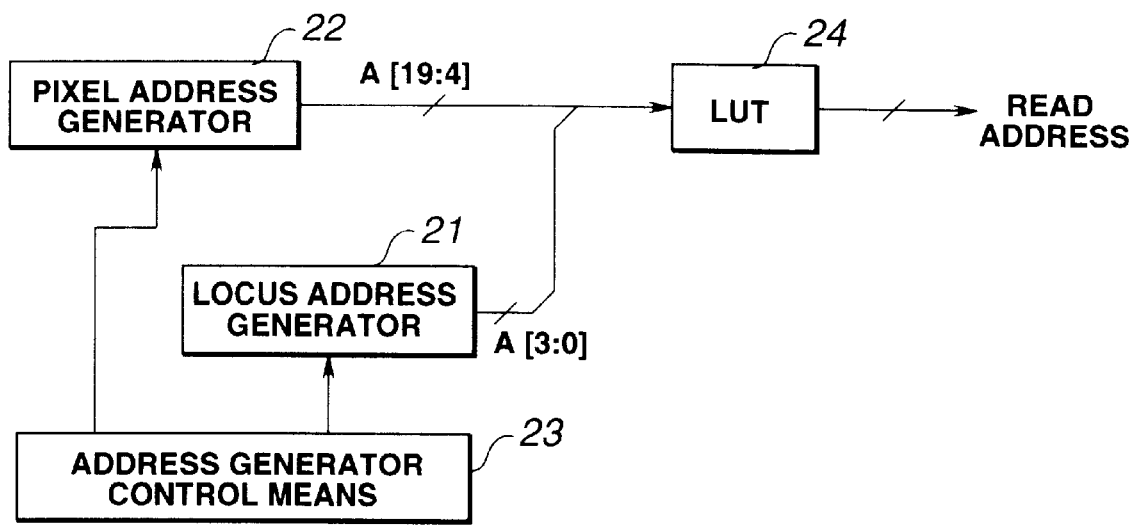
FIG. 10 is a block diagram showing the arrangement of a read control means of FIG. 9.

The read control means 11, as shown in FIG. 10, comprises a locus address generator 21 for generating a wavefront locus address corresponding to time-of-flight data between each point in a scanning region and respective transducers to synthesize a wavefront converging onto a point in the scanning region. The read control means 11 also includes a pixel address generator 22 for generating a pixel address representing a pixel position where respective points in the scanning region subjected to an arithmetic operation process are displayed; an address generator control means 23 for controlling the locus address generator 21 and the pixel address generator 22; and a look-up table (LUT) 24 for converting the combination of the locus address and the pixel address into a read address, which corresponds to sample points along the wavefront locus on the wavefront memory 9.

The operation of the above ultrasonic diagnosis apparatus will now be described. This embodiment is considerably different from the conventional arrangement shown in FIG. 1 at least because it does not require the same apparatus for performing the functions for the types of coordinate transformation and interpolation which are required in a DSC in the conventional arrangement when an ultrasonic tomographic image is generated by a synthetic aperture method.

Figure 9:
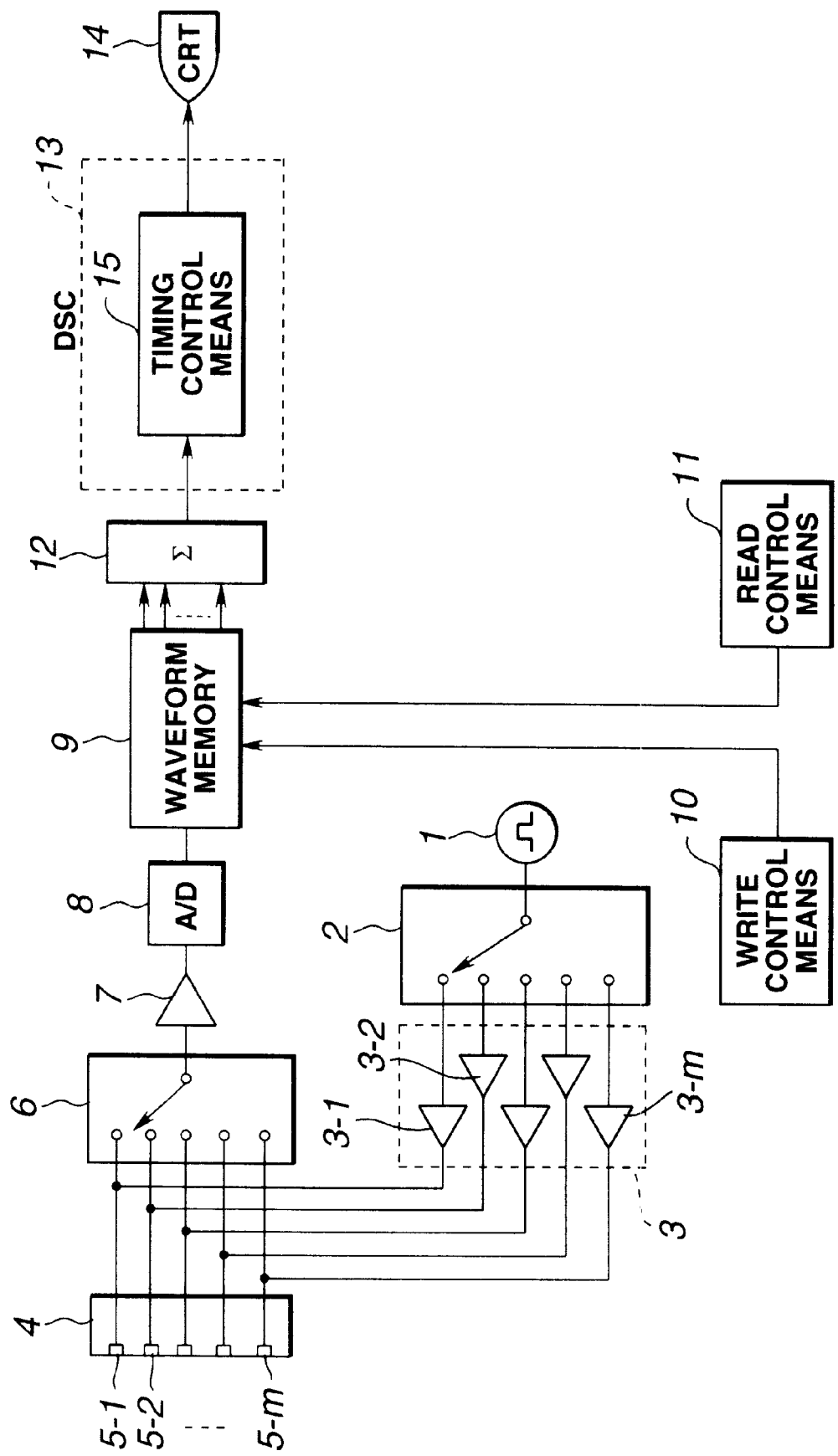
FIG. 9 is a block diagram showing the arrangement of an ultrasonic diagnosis apparatus according to the first embodiment of the present invention.

A transmission signal is generated by the transmission signal generator means 1, and a transmission signal of a signal line corresponding to a specific transducer is selected by the multiplexer 2. Thereafter, the selected transmission signal is amplified by the transmission signal amplifier means 3 to be supplied to the probe 4. Here, when the transducer 5-1 is selected, the multiplexer 2 functions to select the amplifier circuit 3-1 in the transmission signal amplifier means 3, and the transducer 5-1 on the signal line is selected to be driven. Referring to FIG. 9, the amplifier circuits 3-1 to 3-m of the transmission signal amplifier means 3 correspond to the transducers 5-1 to 5-m, respectively.

The transducer 5-1 to which the transmission signal is supplied radiates pulse-like ultrasonic waves to a portion into the living body to be diagnosed. Thereafter, the ultrasonic waves reflected by the tissue of the living body are received by the same transducer 5-1. The signal line of the transducer 5-1 is then selected by the multiplexer 6 and a waveform signal is amplified by the reception signal amplifier means 7. The analog waveform signal obtained through the series of process systems is converted into a digital waveform signal by the A/D converter means 8, to be stored in the waveform memory 9. A write operation into the waveform memory 9 at this time is controlled by the write control means 10.

In the above description, the data acquisition sequence with respect to one transducer is described. This sequence corresponds to an amount of information of one line in the depth direction of an observation region within the living body. Therefore, when the same ultrasonic scanning process is performed to the transducers 5-2 to 5-m, waveform data for a whole image can be obtained. More specifically, as described in the arrangement shown in FIG. 1, the data of a reflected signal related to a portion indicated by a white circle in the observation region shown in FIG. 2 can be obtained. FIG. 2 shows a case wherein the probe is of a convex type. In FIG. 2, reference symbol m denotes the number of scanning directions, i.e., the number of arranged transducers; and k denotes the number of samples in the depth direction in the observation region. In FIG. 3, the image of the waveform data stored in the waveform memory 9 are indicated by solid lines. The write control means 10 addressed the waveform memory 9, and the waveform memory 9 is stored with time-sequential signals representing waveforms, each of which is a reflection amplitude distribution on the corresponding sound-ray.

A method of constructing an ultrasonic tomographic image serving as a characteristic feature of this embodiment will be described below with reference to FIGS. 11 to 15. The waveform data stored in the waveform memory 9 is controlled by the read control means 11, thereby reading the data.

First, one pixel to be output will be described. The intensity of the pixel to be output is calculated such that a process to sum (synthesize) is performed to the waveform samples at the position of a pixel of interest with respect to a plurality of sample points on the waveform locus. The address data of the waveform memory 9 corresponding to the waveform locus are output by the read control means 11. A method of arithmetically operating on the wavefront locus will be described below in detail.

Figure 11:
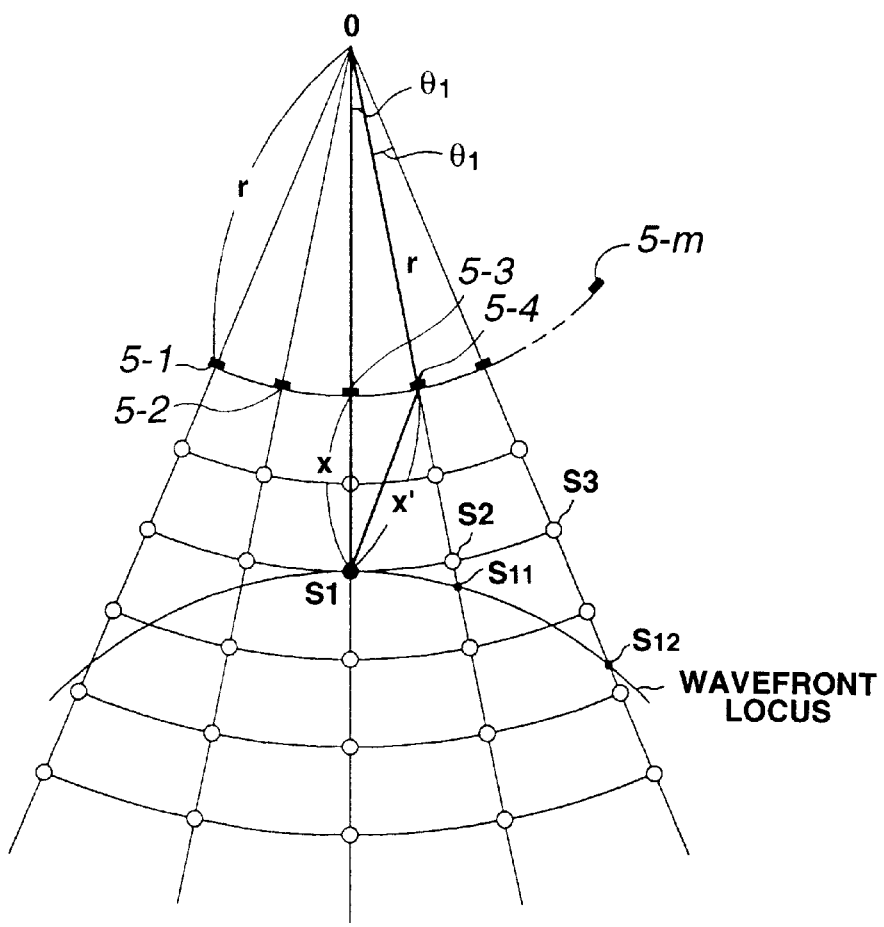
FIG. 11 is a functional view for explaining a wavefront locus in accordance with the invention.

In an example in FIG. 11, the position of the pixel of interest is set as point S1. The point S1 will be described below. The transducer 5-3 is located on a line connecting the point S1 and the imaginary central point O of an arc on which the transducers 5-1 to 5-m are arranged. Here, the distance between the imaginary central point O and each of the transducers 5-1 to 5-m is represented by r; the distance between the transducer 5-3 and the point S1 is represented by x; an angle between adjacent transducers is represented by $\theta_1$; and the distance between the transducer 5-4 adjacent to the transducer 5-3 and the point S1 is represented by x'.

Figure 12:
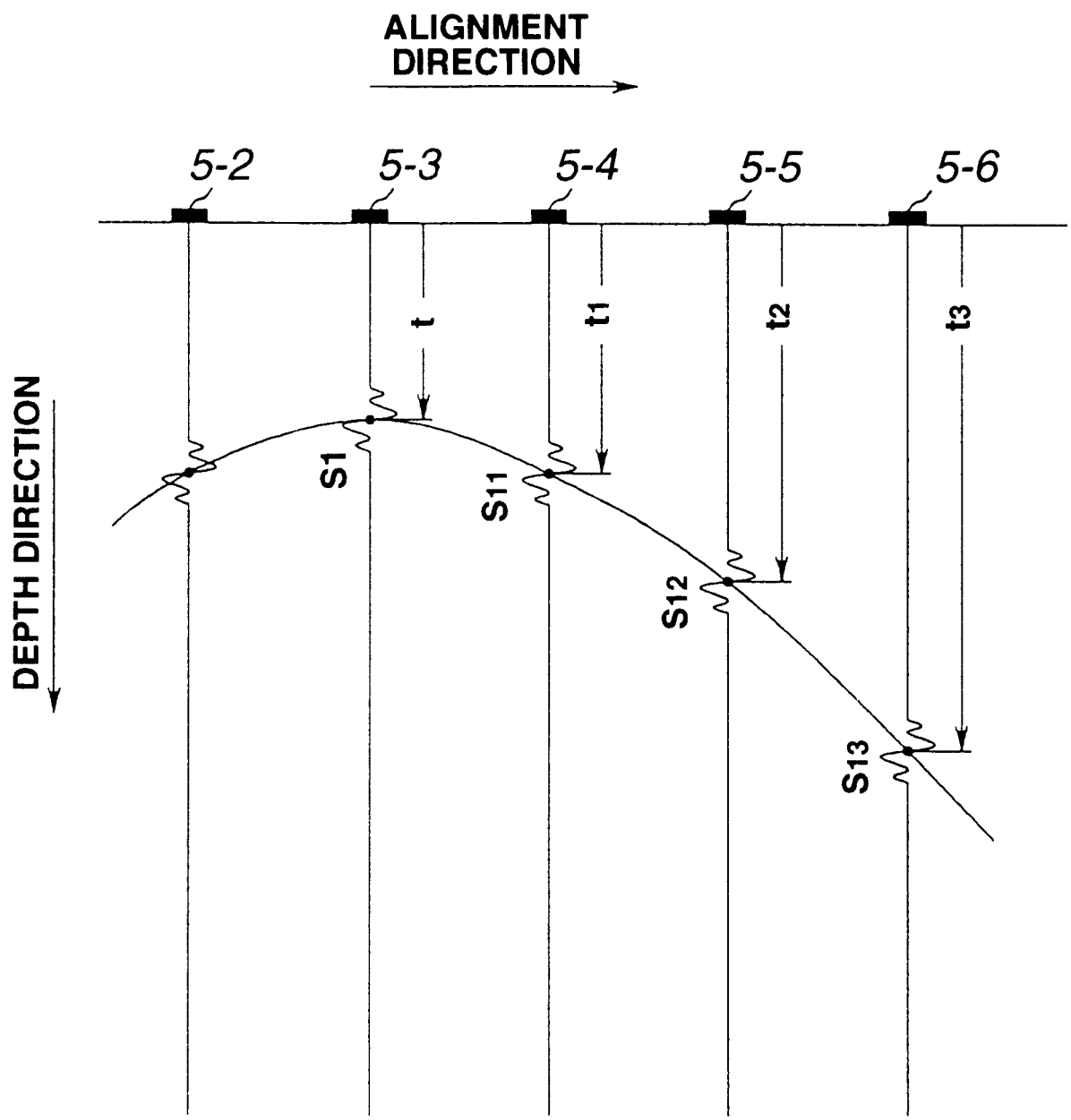
FIG. 12 is a functional view showing the image of wavefront data in accordance with the invention.

Assume that an ultrasonic wave is radiated from the transducer 5-3, that the reflected wave is received, and that a waveform signal having the image shown in FIG. 12 is stored in the wavefront memory 9. In this case, the distance x between the point S1 and the transducer 5-3 and a propagation time t have relationship represented by the following equation:

$$t = 2x/c \quad (4)$$

where c is the sound velocity.

Similarly, when the distance between a sound ray adjacent to the point S1 and the transducer 5-4 is given, a sample point on a wavefront locus can be calculated. A distance x' between the transducer 5-4 adjacent to the transducer 5-3 and the point S1 is given by the following equation:

$$x' = \{(r+x)^2 + r^2 - 2r(r+x)\cos(\theta_1)\}^{1/2} \quad (5)$$

According to (4) and (5), sample point $S_{11}$ on the wave surface locus can be expressed by the following equation:

$$t_1 = 2x'/c = (2/C) \cdot \{((r+x)^2 + r^2 - 2r(r+x)\cos(\theta_1)\}^{1/2} \quad (6)$$

When points $S_{12}$ and $S_{13}$ are calculated in a substantially similar way as the point $S_{11}$, a wavefront locus related to the point S1 can be calculated.

With the above-described procedure, a sample point on a wavefront locus with respect to one pixel to be output can be calculated.

Figure 13:
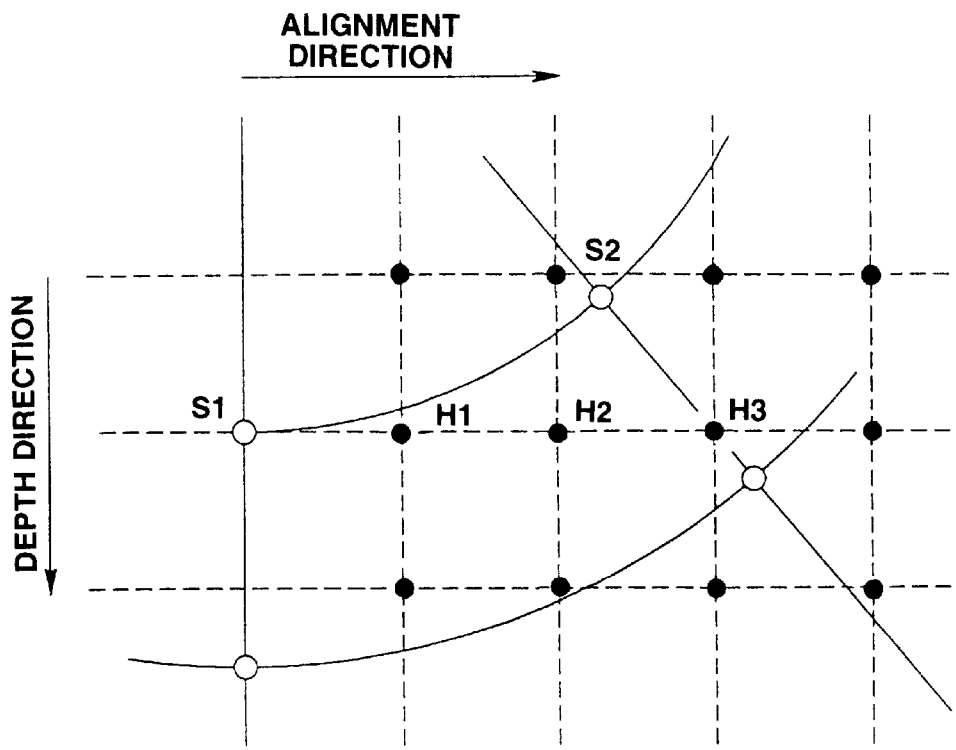
FIG. 13 is an enlarged functional view showing a peripheral portion of point S1 in FIG. 11.

FIG. 13 is an enlarged view showing a portion around the point S1 in FIG. 11. In the arrangement in FIG. 1, pixels subjected to an arithmetic operation process are arithmetically operated in order of points S2, S3, . . . on an adjacent sound ray next to the point S1. On the other hand, in this embodiment, pixels subjected to an arithmetic operation process are arithmetically operated on with respect to all parts of the pixels serving as output images in order of S1→H1→H2→H3. Here, the arithmetic operation process at points H1, H2, and H3 corresponds to an interpolation process performed between sound rays of the arithmetic operation process applied to the arrangement in FIG. 1.

Figure 14:
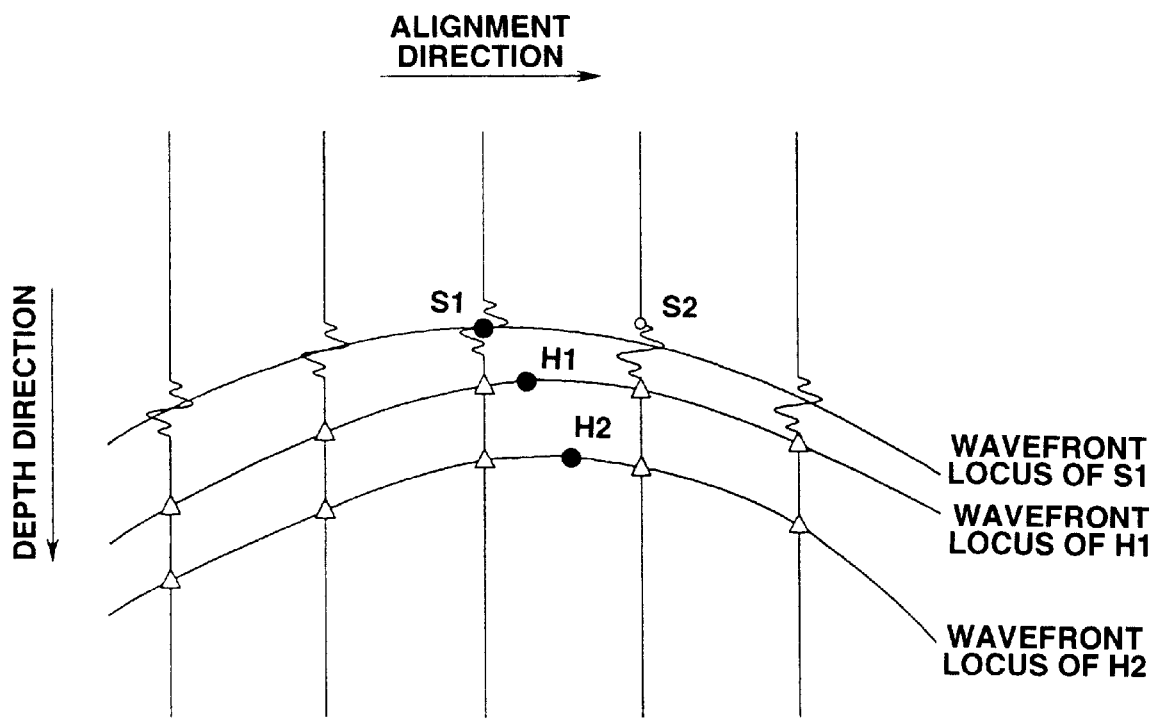
FIG. 14 is a functional view for explaining a data read operation from a wavefront memory in accordance with the invention.

FIG. 14 is a view showing the image of waveform data stored in the wave surface memory 9. Points H1, H2, . . . of the interpolation process pixels correspond to the positions of the respective points indicated by black circles. These points H1, H2, . . . are not located on sound rays, and there is no actual waveform data. However, when three points constituting a triangle (mark Δ) on the sound rays are used as a wavefront locus and synthesized, data of the pixels corresponding to the points H1, H2, . . . can be obtained.

Like the point S1, when the distances between the points H1, H2, . . . of interpolation process pixels and the respective transducers are calculated, sample points constituting a wavefront locus are calculated. This arrangement can be realized by the arrangement of the read control means 11 shown in FIG. 10.

The operation of the read control means 11 will now be described. The locus address generator 21 counts the sample points of a wavefront locus required for an arithmetic operation with respect to one pixel in an ultrasonic scanning region to transmit a wavefront locus address A[3:0] corresponding to this wavefront locus. Here, A[3:0] represents the 4 lower bits of a 20-bit address.

Figure 15:
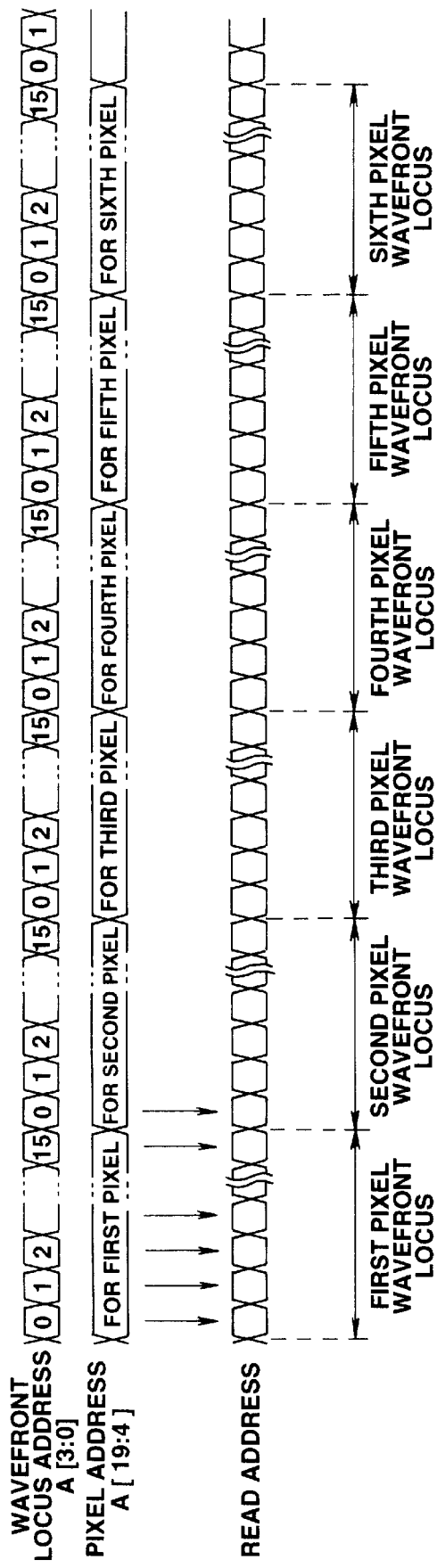
FIG. 15 is a timing chart for explaining the operation of the read control means in accordance with the invention.

In this embodiment, as shown in FIG. 15, a wavefront locus is represented by 16 sample points, wherein the value of 0 to 15 are counted to be the output of a wavefront locus address. Although the number of sample points representing a wavefront locus may be changed in accordance with the position of a pixel of interest, the number of sample points are kept constant (in this case, 16 sample points) to simplify the process. In this case, the locus address generator 21 can be implemented using a simple hexadecimal up-counter.

The pixel address generator 22 also generates a pixel address A[19:4] corresponding to a pixel position of a display device such as a monitor to designate pixels at which the respective points of an ultrasonic scanning region subjected to an arithmetic operation process are displayed. Here, A[19:4] indicates the 16 upper bits of the 20-bit address.

A pixel address and a wavefront locus address generated by the pixel address generator 22 and the locus address generator 21 are input to the LUT means 24 as an upper address and a lower address, respectively. More specifically, according to this embodiment, the wavefront locus address and the pixel address are combined and considered as a 20-bit address. Of this 20-bit address, the 4 lower bits and the 16 upper bits are input to the LUT means 24 as a wavefront locus address A[3:0] and a pixel address A[19:4].

The LUT means 24 reads an address corresponding to each sample point of a wavefront locus to be synthesized on the basis of the input wavefront locus address and the input pixel address, and outputs the read address. The read address output from the LUT means 24 serves as an address on the waveform memory 9 and has an image shown in FIG. 15.

In the LUT means 24, an address on the waveform memory 9 corresponding to the waveform locus address and the pixel address is arithmetically operated in advance and stored. The address on the waveform memory 9 is a datum which means a wavefront locus address corresponding to the pixel position of an output image as described above. The LUT means 24 processes a large amount of data at a high speed. For this reason, the LUT means 24 is constituted by a large-scale and a high-speed memory or the like.

A series of address controls in the read control means 11 is performed by the address generator control means 23, thereby adjusting timing or the like. Referring to FIG. 15, the first pixel wavefront locus, the second pixel wavefront locus, the third pixel wavefront locus, . . . correspond to data located at the points S1, H1, H2, H3, . . . , respectively.

When the pixel address generated by the pixel address generator 22 is changed, enlargement, reduction, mirror inversion, rotation, and the like of an image can be performed according to the manner of control of the pixel address.

In this manner, a read address to the waveform memory 9 is generated by the read control means 11, and waveform samples are output from the waveform memory 9 according to the read address.

The waveform samples read from the waveform memory 9 are summed by the summing circuit 12 to be converted into data corresponding to the intensity of each pixel. The intensity data of an output from the summing circuit 12 are sent to the DSC 13 and processed to be output to the display means 14 such as a monitor as a tomographic image for observation. However, the intensity data when they are input to the DSC 13 have already corresponded to all the pixels of an output image, an arithmetic operation process corresponding to coordinate transformation and interpolation process has already been performed. For this reason, in the DSC 13, only timing control may be performed by the timing control means 15.

In the above embodiment, a process corresponding to coordinate transformation and interpolation process is synthesized within the read control means 11 and the summing circuit 12 using the LUT means 24. Therefore, hardware relating to coordinate transformation and interpolation processing as in FIG. 1 can be eliminated.

In the above embodiment, a convex-type probe is described. However, a probe which is of a linear type, a radial type, or the like can be realized by the same means as described above. When the data of the read address stored in the LUT means 24 are rewritten, the embodiment can cope with a plurality of probes. In addition, a plurality of LUT means 24 may be implemented, and these LUT means may be selectively used. In this manner, switching among a plurality of probes and a plurality of display ranges can be done instantaneously.

In the above embodiment, the use of an electronic scanning ultrasonic probe is described. When the unit in front of the A/D converter means 8 in FIG. 9 is replaced with a mechanical scanning type (radial scanning type) unit, a switching operation for probes can be similarly performed by rewriting data in the LUT means 24 in the read control means 11.

In the above embodiment, a LUT is used as the read control means 11. However, when an arithmetic unit such as a DSP (Digital Signal Processor, the processing speeds of which have been significantly increased in recent years) is used, substitution of the read control means 11 is possible, and a memory having a large capacity and constituting the LUT can be eliminated.

In the above embodiment, the pixels are synthesized as a whole with respect to an image to be displayed so as to produce the tomographic image. However, the embodiment is not limited to this arrangement, and a simple filtering process for the processed image, enlargement of an image size, and the like may be performed after the synthesis process.

As has been described above, according to this embodiment, all the pixels of an image to be displayed are synthesized to generate a tomographic image, so that a process corresponding to coordinate transformation and interpolation process is performed in this synthesis process. For this reason, a high-quality ultrasonic tomographic image having improved resolution can be obtained in comparison with an interpolation process which is generally performed by an ultrasonic diagnosis apparatus using a synthetic aperture method. In addition, hardware which is required for coordinate transformation and interpolation processing (which are performed by the DSC or the like) is not necessary, and the arrangement of the DSC can be simplified, thereby realizing a compact apparatus. A preferable ultrasonic tomographic image can be obtained by the simple DSC.

Figure 16:
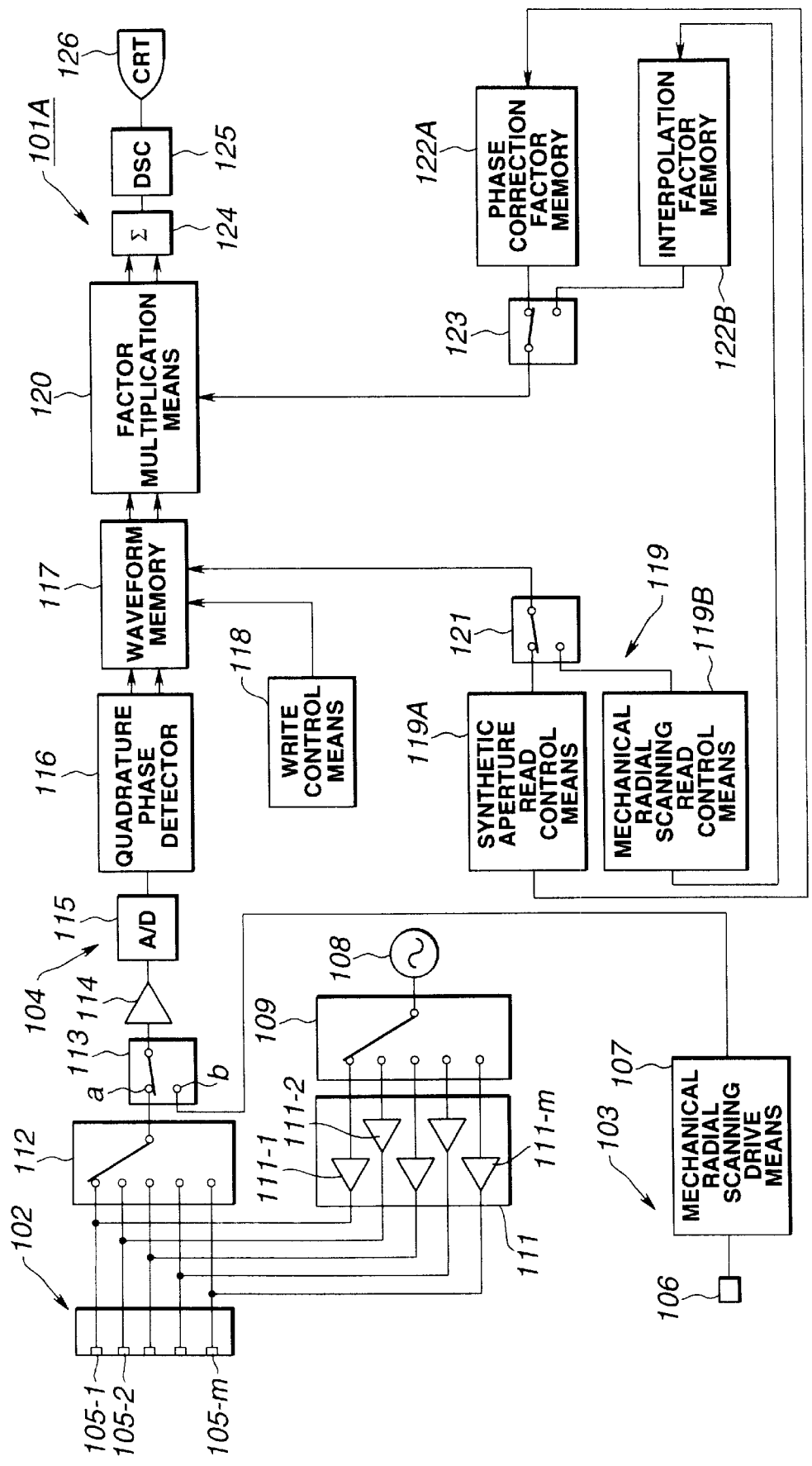
FIG. 16 is a block diagram showing the arrangement of an ultrasonic diagnosis apparatus according to the second embodiment of the present invention.
Figure 17:
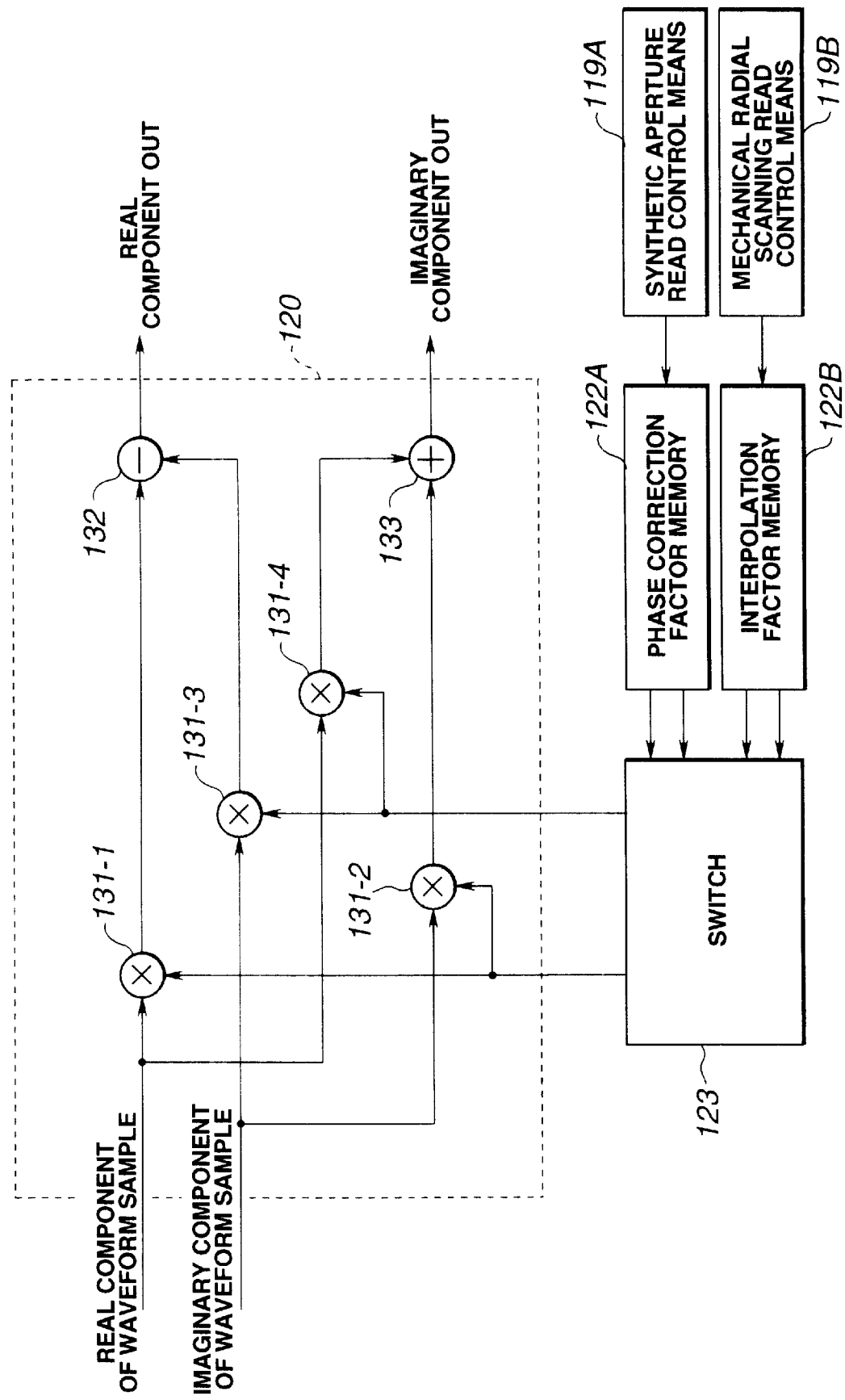
FIG. 17 is a block diagram showing the arrangement of a factor multiplication means in the arrangement in FIG. 16.
Figure 18:
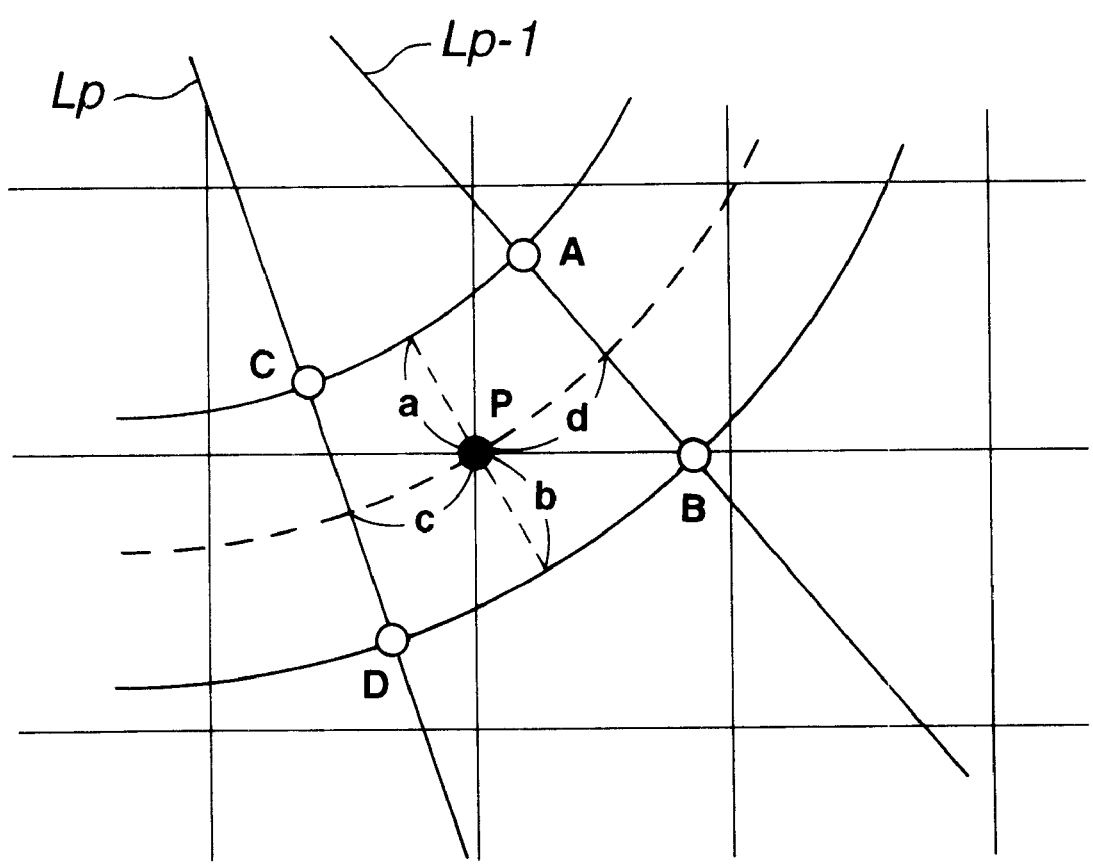
FIG. 18 is a view for explaining an interpolation process in a mechanical radial scanning mode in accordance with the invention.

The second embodiment of the present invention will now be described. FIGS. 16 to 18 show the second embodiment of the present invention. In the second embodiment, an arrangement of an ultrasonic diagnosis apparatus having both an electronic scanning probe and a mechanical scanning probe is described.

According to the second embodiment, in an ultrasonic diagnosis apparatus having a function of performing electronic scanning by a synthetic aperture method, an ultrasonic diagnosis apparatus which can cope with both types of scanning operations is realized by only changing a control portion for reading a reception signal of a polar coordinate form as received according to an orthogonal coordinate form and factors multiplied to interpolate for the read data when a mechanical radial scanning operation is performed.

As shown in FIG. 16, an ultrasonic diagnosis apparatus 101A according to the second embodiment comprises an electronic scanning ultrasonic probe 102, a mechanical scanning ultrasonic probe 103, and an ultrasonic observation apparatus 104 which can cope with both the electronic scanning ultrasonic probe 102 and the mechanical scanning ultrasonic probe 103.

The electronic scanning ultrasonic probe 102 has a transducer group composed of a plurality of transducers 105-1 to 105-m arranged in the form of an array. The mechanical scanning ultrasonic probe 103 incorporates a transducer 106 for performing a mechanical radial scanning operation. The mechanical radial scanning drive means 107 performs a mechanical radial scanning drive operation to the transducer 106.

The ultrasonic observation apparatus 104 has a transmission signal generator means 108, and the transmission signal generator means 108 generates a transmission signal. The transmission signal is applied to a transducer 105-i through transmission amplifiers 111-i (i=1, ..., m) of a transmission signal amplifier means 111. The amplifiers 111-i are selected by a multiplexer 109 serving as a transmission transducer selection means, so that an ultrasonic pulse generated by each transducer 105-i can be irradiated on a target object.

Each transducer 105-i is connected to a multiplexer 112 serving as a reception transducer selection means through a signal line to select one transducer 105-i from the transducer group. The same transducer 105-i as the transducer 105-i used in transmission is selected by the multiplexer 112 such that an ultrasonic pulse reflected from a living body tissue is received and converted into an electric signal to generate an ultrasonic waveform signal (echo signal).

The obtained ultrasonic waveform signal is input to an amplifier 114, serving as a reception signal amplifier means, through contact "a" of a switch 113 (serving as a switching means) and amplified to have a predetermined magnitude. An ultrasonic waveform signal from the transducer 106 is input to contact "b" of the switch 113. A switching operation of the switch 113 is performed according to which of the electronic scanning ultrasonic probe 102 or the mechanical scanning ultrasonic probe 103 which is actually used. In the state shown in FIG. 16, the electronic scanning ultrasonic probe 102 is used and, therefore, is described first.

An output signal from the amplifier 114 is input to an A/D converter 115 to be converted into a digital waveform signal. The digital waveform signal is input to a quadrature phase detecting circuit 116 and is subjected to quadrature phase detection such that it is separated into a complex waveform signal consisting of a real component and an imaginary component. The complex waveform signal is written in a waveform memory 117. This write operation is controlled by a write control means 118. The complex waveform signal written in the waveform memory 117 is read by a read control means 119 and input to a factor multiplication means 120.

The read control means 119 has a synthetic aperture read control means 119A and a mechanical radial scanning read control means 119B. The read control means 119A or 119B on the side selected by a switch 121 performs read control of data from the waveform memory 117.

In this embodiment, the ultrasonic diagnosis apparatus has a phase correction factor memory 122A in which phase correction factors are stored for synthetic aperture processing and an interpolation factor memory 122B in which interpolation factors are stored for interpolating amplitude data acquired in mechanical scanning. When the read control means 119A or 119B which is selected by the switch 121 performs read control of a waveform sample from the waveform memory 117, read control of a factor stored in one corresponding memory of the phase correction factor memory 122A and the interpolation factor memory 122B is also performed. The read factor is input to the factor multiplication means 120 through a switch 123.

The switches 113, 121, and 123 are synchronized and/or interlocked to switch together. When the mechanical scanning ultrasonic probe 103 is used, the switches 113, 121, and 123 are switched in an interlocking manager.

Output data from the factor multiplication means 120 are summed by a summing circuit 124 to be synthesized, and the data are supplied to a CRT 126 through a DSC 125 to display an ultrasonic image.

FIG. 17 shows a detailed circuit arrangement of the factor multiplication means 120. The real component and imaginary component of the complex waveform samples read from the waveform memory 117 are input to multipliers 131-1 and 131-2 and multipliers 131-3 and 131-4, respectively. The real component and imaginary component are multiplied by respective factors input through the switch 123 and read from the factor memory 122A or 122B, respectively.

An output from the multiplier 131-1 is input to a subtracter 132 to subtract an output from the multiplier 131-3 from the output from the multiplier 131-1 to produce a real component which is output from the factor multiplication means 120. In addition, an output from the multiplier 131-2 is input to an adder 133 to add an output from the multiplier 131-4 to the output from the multiplier 131-2 to produce an imaginary component which is output from the factor multiplication means 120.

When the electronic scanning ultrasonic probe 102 is used, synthesis performed by the factor multiplication means 120 is performed according to the following processes.

As described above, the ultrasonic diagnosis apparatus corrects the phase of the complex waveform samples read from the waveform memory 117. This is because the ultrasonic waveform signals received by transducers 105-1 to 105-m are out of phase with each other caused by the differences in time-of-flight of ultrasonic pulse travelling between a certain point in a scanning region and the respective transducers. A simple summation of the complex waveform samples may result in a lower synthesized output even if stronger reflection signals are received. To recover this, the phase correction is applied to each of the complex waveform samples.

Assume that a real component and an imaginary component of a complex waveform sample are represented by In and Qn. The index n denotes the number of transducers 105-1 to 105-m and the relative phase of a complex waveform sample corresponding to transducer 105-n, where the relative phase is measured on the basis of the phase corresponding to a reference transducer 105-ref ($1 \leq \text{ref} \leq m$). The reference transducer 105-ref is selected out of the transducers which construct the aperture to be synthesized, e.g. the central transducer in the aperture. In this case, the following equation is established:

$$(In + jQn) \times An\exp(j\phi n) = \{In \cdot An \cdot \cos(\phi n) - Qn \cdot An \cdot \sin(\phi n)\} + \quad (2)$$

$$j\{In \cdot An \cdot \sin(\phi n) + Qn \cdot An \cdot \cos(\phi)\}$$

where An is an amplitude correction factor. When Ci is substituted for $An \cdot \cos(\phi n)$, and Cq is substituted for $An \cdot \sin(\phi n)$, equation (2) is converted into the following equation:

$$(2) = (In \cdot Ci - Qn \cdot Cq) + j(In \cdot Cq + Qn \cdot Ci) \quad (3)$$

These phase correction factors Ci and Cq are calculated beforehand (i.e., are predetermined) and stored in, e.g., a pair of real and imaginary data memories of the phase correction factor memory 122A.

Concerning the phase correction in more detail, refer to U.S. patent application Ser. No. 08/858,538 by Okubo et al., filed on May 16, 1997.

As shown in FIG. 18, in a mechanical radial scanning operation, waveform samples A, B, C, and D obtained along adjacent sound rays Lp-1 and Lp by radial scanning are interpolated to calculate pixel data at point P. The distances from point P to the lines AC, BD, CD, and AB are represented by a, b, c, and d, respectively. Arc-like lines shown in FIG. 18 are lines on a wavefront of a sound wave, while grating points on horizontal lines and vertical lines relate to pixel positions displayed on the CRT 126.

Interpolation data at point P indicated by a black circle in FIG. 18 are calculated by the following equation:

$$P = \{c/(c+d) \cdot \{b/(a+b)\} \cdot A + \qquad (4)$$
$$\{c/(c+d) \cdot \{a/(a+b)\} \cdot B +$$
$$\{d/(c+d) \cdot \{b/(a+b)\} \cdot C +$$
$$\{d/(c+d) \cdot \{a/(a+b)\}) \cdot D$$

In this manner, the four points corresponding to pixels in a display image are sequentially read from the wavefront memory 117 by the mechanical radial scanning read control means 119B, and mechanical radial scanning interpolation factors Ci and Cq corresponding to the four points are stored in the interpolation factor memory 122B.

For example, the interpolation factors of the waveform sample A are given by the following equations:

$$Ci = \{c/(c+d) \cdot \{b/(a+b)\}$$
$$Cq = 0$$

With respect to the sound-ray data B, C, and D, the factors given by equation (4) are similarly stored in the interpolation factor memory 122B.

Complex waveform samples read from the wavefront memory 117 and factors in the factor memory 122A or 122B in which factor information is stored are subjected to a multiplication process in accordance with the electronic scanning and the mechanical scanning, so that a synthetic aperture process or an interpolation process of a display on the CRT 126 can be performed.

The operation of the second embodiment will now be described.

In an electronic scanning mode, the switches 113, 121, and 123 select the line side of the electronic scanning mode as shown in FIG. 16. A transmission signal from the transmission signal generator means 108 passes through one contact selected in the multiplexer 109. The ultrasonic transducer 105-i is driven through the transmission amplifier 111-i electrically connected to the contact, and an excitation ultrasonic wave is irradiated into a living body.

An ultrasonic wave reflected by an acoustic impedance change portion is received by the ultrasonic transducer 105-i which was used for transmission and serves as a reception waveform signal. The reception waveform signal is input to the amplifier 114 (through the switch 113) to be amplified.

The amplified waveform signal is converted into a digital waveform signal by the A/D converter 115, and the digital waveform signal is converted into a complex waveform signal consisting of a real component and an imaginary component by the quadrature phase detecting circuit 116. Thereafter, the complex waveform signals are stored in the waveform memory 117. When the above processes are repeated with respect to all the transducers 105-1 to 105-m, complex waveform signals of one image are generated. A write operation to the waveform memory 117 is controlled by the write control means 118.

As shown in FIG. 16, when the switch 121 connects the synthetic aperture read control means 119A to the waveform memory 117, complex waveform samples on a wavefront locus corresponding to the probe 102 used for each pixel of a display image are read.

The phase correction factor memory 122A is selected by the switch 123, and a phase correction factor (corresponding to the complex waveform samples read from the waveform memory 117) is read from the synthetic aperture read control means 119A. The read complex waveform samples and the phase correction factor are synthesized by the factor multiplication means 120.

In this case, synthesis in the factor multiplication means 120 is performed in the following manner. Ci and Cq, given by equation (2) or (3), serve as phase correction factors and are read from the phase correction factor memory 122A. The factors Ci and Cq, the real component and the imaginary component of the complex waveform samples read from the waveform memory 117 are subjected to a multiplication process, respectively, thereby performing phase correction.

Sixty-four real and imaginary complex waveform samples are subjected to phase correction as described above are summed by the summing circuit 124. Thereafter, the mean square of the 64 complex waveform samples is calculated. These processes are sequentially repeated, timing control is performed by the DSC 125, and the resultant data are displayed on the CRT 126.

The flow of processes when the mechanical radial scanning mode is selected will now be described.

In this case, the switches 113, 121, and 123 select the line of the mechanical radial scanning mode.

When the switch 113 selects the line of the mechanical radial scanning mode, a waveform signal reflected from a living body and received by the transducer 106 is input to the amplifier 114. A transmission signal is applied from the transmission signal generator means 108 to the transducer 106 through a switch (not shown).

The mechanical radial scanning drive means 107 performs drive control for mechanically controlling the transducer 106. In this manner, the waveform signals sequentially obtained by radial scanning and received are input to the amplifier 114 through the switch 113.

The analog waveform signal amplified by the amplifier 114 is converted into a digital signal by the A/D converter 115, and the digital signal is separated into real and imaginary components by the quadrature phase detecting circuit 116. Thereafter, the real and imaginary components of the digital waveform signal are stored in the waveform memory 117. More specifically, waveform signals obtained by radial scanning are sequentially controlled by the write control means 118 to be written in the waveform memory 117.

Since the written complex data are polar coordinate data, the polar coordinate data must be transformed into an orthogonal coordinate to display the data on the CRT 126. A four-point interpolation method shown in FIG. 18 is generally used as an interpolation method.

More specifically, as shown in FIG. 18, waveform samples A, B, C, and D are read from the waveform memory 117, and interpolation factors Ci and Cq are read from the interpolation factor memory 122B according to the sound ray data and multiplied by the factor multiplication means 120 in FIG. 17.

The four points are summed by the summing circuit 124 to calculate a mean square of the real component and an imaginary component, so that pixel intensity at point P can be calculated.

At this time, all the imaginary interpolation factors in the mechanical radial scanning operation are zero. When the above processes are repeated in accordance with pixels to be displayed, pixel data of one image can be obtained.

As described above, according to this embodiment, when factors are read from the factor memories 122A and 122B by the read control means 119 (regardless of electronic scanning or mechanical radial scanning) and are subjected to a factor multiplication process, pixel data of a display image can be calculated. For this reason, timing control is performed by the DSC 125, and the data can be displayed on the CRT 126 serving as a display means.

According to this embodiment, in order to cause the ultrasonic observation apparatus 104 using a synthetic aperture method to cope with mechanical radial scanning, a coordinate transforming circuit or an interpolation circuit for mechanical scanning need not be newly added. In the above arrangement, the ultrasonic observation apparatus 104 can handle both the scanning operations by only slight modification, such as the mechanical radial scanning read control means 119B and interpolation factor memory 122B. For this reason, the cost can be reduced, and the ultrasonic diagnosis apparatus 101A can be reduced in size.

In the above description, for descriptive convenience, the maximum number of data subjected to aperture synthesis is set to 64. However, the maximum number of data subjected to actual aperture synthesis may be set to another value, for example, 128, and the maximum number of data subjected to aperture synthesis is not limited to a specific value.

The above embodiment can also be applied when mechanical sector scanning is performed in place of mechanical radial scanning.

An embodiment obtained by partially combining the above embodiments is also contemplated by the present invention.

In the present invention, it is apparent that embodiments which are different from each other in a wide range can be constituted on the basis of the present invention without departing from the spirit and scope of the invention. The present invention is limited to the accompanying claims, but is not limited to a specific embodiment.

What is claimed is:

1. An ultrasonic diagnosis apparatus comprising:

a probe having a plurality of transducers for performing transmission and reception of ultrasonic waves, the transducers including radiating surfaces;

a selection means for sequentially selecting said transducers for performing transmission and reception of the ultrasonic waves;

an A/D converter for converting a reception waveform signal from said transducer selected by said selection means into a digital waveform signal;

a waveform memory for storing said digital waveform signal;

a read control means having a wavefront locus generator for generating wavefront locus data corresponding to time-of-flight data between each point in an ultrasonic scanning region and respective transducers to synthesize a wavefront converging on one or more points in the ultrasonic scanning region, including points which are not located normal to the radiating surfaces of said transducers, the read control means further having an output unit for outputting the wavefront locus data to the waveform memory as read addresses in order to read waveform samples along the wavefront; and a synthesis means for synthesizing the waveform samples read from the waveform memory by the read addresses from said read control means.

2. The ultrasonic diagnosis apparatus according to claim 1, wherein said read control means further comprises a pixel address generator for generating pixel addresses representing pixel positions at which each point of said ultrasonic scanning region is displayed, and said output unit outputs said read addresses on the basis of said pixel addresses and said wavefront locus data.

3. The ultrasonic diagnosis apparatus according to claim 2, wherein said output unit is a look-up table, and said pixel addresses and said wavefront locus data are assigned to upper and lower addresses of said look-up table, respectively.

4. The ultrasonic diagnosis apparatus according to claim 3, wherein said output unit comprises a plurality of said look-up tables which can be selected depending on said ultrasonic scanning region or the type of probe employed.

5. The ultrasonic diagnosis apparatus according to claim 1, further comprising:

a factor memory for storing factor information corresponding to said waveform samples read from said waveform memory, said factor information including a phase correction factor corresponding to time-of-flight data between each point in the scanning region and a respective transducer, and an interpolation factor corresponding to each pixel of a display image;

a multiplication process means for multiplying the waveform samples read from said waveform memory and corresponding factors read from said factor memory; and an arithmetic synthesis operation means for performing an arithmetic synthesis operation to a plurality of data processed by said multiplication process means, wherein said read control means selects factor information of said phase correction factor from said factor memory in an electronic scanning operation, and selects factor information of said interpolation factor from said factor memory in a mechanical radial scanning operation.

6. An ultrasonic diagnosis apparatus comprising:

a transducer group obtained by arranging transducers for transmitting and receiving ultrasonic waves in the form of an array;

an electronic scanning means for selecting a specific transducer from said transducer group for transmission and reception to perform an electronic scanning operation;

a mechanical scanning means for performing a mechanical radial scanning operation for said transducers for transmitting and receiving the ultrasonic waves;

a switching means for performing a switching operation between a reception waveform signal in the electronic scanning operation and a reception waveform signal in the mechanical radial scanning operation;

an A/D converter means for converting the reception waveform signal obtained by the electronic scanning operation or the mechanical scanning operation into digital waveform data;

a waveform memory for storing said digital waveform data in a time-sequential manner;

a waveform sample read means for reading digital waveform samples read from said waveform memory in correspondence with pixels of display images in respective scanning operations;

a factor memory for storing factor information corresponding to the waveform samples read from said waveform memory;

a multiplication process means for multiplying the waveform sample read from said waveform memory and corresponding factors read from said factor memory;

an arithmetic synthesis operation means for performing an arithmetic synthesis operation to a plurality of data processed by said multiplication process means; and a read control means for selecting factor information of a phase correction factor corresponding to time-of-flight data between each point in a scanning region and respective transducers from said factor memory in an electronic scanning operation, and selecting factor information of an interpolation factor corresponding to each pixel of a display image from said factor memory.

7. An apparatus for receiving reflected ultrasonic waves from a scanning region and converting the reflected waves into data representing intensities of pixels of an output device, the apparatus comprising:

a first probe including an array of ultrasonic transducers, each transducer being adapted to transmit an incident ultrasonic wave into the scanning region along a respective ray and receive a predetermined number of samples of the reflected ultrasonic wave of the incident ultrasonic wave along the respective ray from the scanning region, each transducer also receiving other reflected waves corresponding to samples along other respective rays;

a multiplexing and demultiplexing device coupled to the transducer array and configured such that the transducers transmit the incident ultrasonic waves in a predetermined sequence and receive the samples in a predetermined sequence;

a memory unit adapted to store the samples and the other reflected waves corresponding to samples along other respective rays corresponding to a first spacial coordinate system of the scanning region, the memory unit being adapted to write according to write addresses and retrieve according to read addresses;

a locus addressing unit adapted to produce first portions of intermediate read addresses corresponding to respective wavefront loci, each wavefront locus representing at least one of: (i) a sample from one of the transducers and the other reflected waves corresponding to samples along other respective rays, and (ii) an interpolated sample not located on a ray and other reflected waves corresponding to the interpolated sample which would be received from other respective rays;

a pixel addressing unit adapted to produce second portions of the intermediate read addresses corresponding to the pixels of the output device; and an address conversion unit adapted to receive the intermediate read addresses and convert them into the read addresses such that the waveform loci are converted into a second spacial coordinate system corresponding to the pixel location of the output device when they are read from the memory.

8. The apparatus of claim 7, wherein the address conversion unit is a look-up-table.

9. The apparatus of claim 7, further including a plurality of probes having different output characteristics, the address conversion unit including a plurality of look-up-tables, each look-up-table being adapted to correspond to and be selectable for use with one or more of the plurality of probes.

10. The apparatus of claim 7, wherein the first coordinate system is a polar coordinate system and the second coordinate system is a Cartesian coordinate system.

11. The apparatus of claim 7, further including an A/D converter, the reflected waves being analog and converted by the A/D converter for storing in the memory unit.

12. The apparatus of claim 7, further including a summing unit adapted to receive each waveform locus and sum the sample and other reflected waves corresponding to the sample received from the other rays to produce an intensity for a particular pixel of the output device.

13. The apparatus of claim 7, further including a summing unit adapted to receive each waveform locus and sum the interpolated sample and other reflected waves corresponding to the interpolated sample to produce an intensity for a particular pixel of the output device.

* * * * *